United States Patent
Choi et al.

(10) Patent No.: US 11,259,186 B2
(45) Date of Patent: Feb. 22, 2022

(54) SYSTEMS AND METHODS FOR VALIDATING A DEVICE AND AUTHENTICATING A USER

(71) Applicant: Verizon Patent and Licensing Inc., Arlington, VA (US)

(72) Inventors: Byunghun Choi, Summit, NJ (US); Jyotsna Kachroo, Millburn, NJ (US); Ray P. Hwang, Green Brook, NJ (US); Dayong He, Bridgewater, NJ (US); Samirkumar Patel, Middlesex, NJ (US); Emilia C. Quijano, East Brunswick, NJ (US); Young Rak Choi, Belle Mead, NJ (US); Warren Hojilla Uy, Randolph, NJ (US); Feng Luo, Livingston, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 540 days.

(21) Appl. No.: 16/244,759

(22) Filed: Jan. 10, 2019

(65) Prior Publication Data
US 2020/0228972 A1 Jul. 16, 2020

(51) Int. Cl.
*H04L 29/06* (2006.01)
*H04W 76/10* (2018.01)
*H04W 12/50* (2021.01)
*H04W 12/069* (2021.01)

(52) U.S. Cl.
CPC ......... *H04W 12/50* (2021.01); *H04L 63/0861* (2013.01); *H04W 12/069* (2021.01); *H04W 76/10* (2018.02)

(58) Field of Classification Search
CPC ... H04W 12/50; H04W 12/069; H04W 76/10; H04L 63/0861; H04L 63/0823
See application file for complete search history.

(56) References Cited

U.S. PATENT DOCUMENTS

| | | | |
|---|---|---|---|
| 2016/0050565 A1* | 2/2016 | Benoit | H04W 12/06 726/9 |
| 2018/0083942 A1* | 3/2018 | Someya | H04L 63/083 |
| 2018/0255419 A1* | 9/2018 | Canavor | H04L 63/083 |

* cited by examiner

*Primary Examiner* — Nelson S. Giddins

(57) ABSTRACT

A device determines information concerning the device and sends the information concerning the device to a first device. The device receives, from the first device, information concerning a user device, and receives, from a second device, a request concerning the user device accessing the device. The request includes information identifying the device and information identifying the user device. The device generates a request response by validating the user device for access to the device based on the request and sends, to the second device, the request response to facilitate a communication session to be established between the user device and the device. The device communicates with the user device via the communication session.

20 Claims, 9 Drawing Sheets

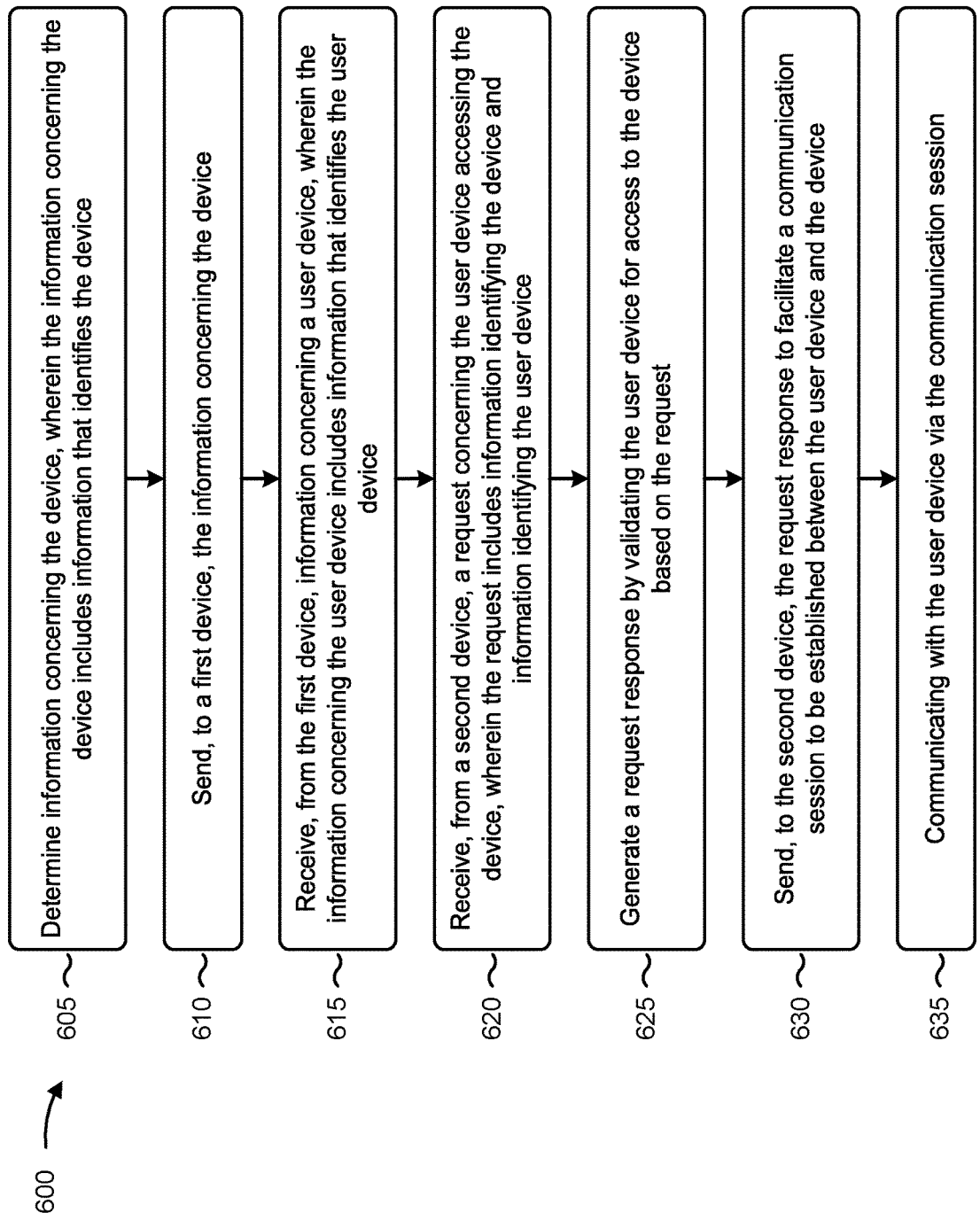

SYSTEMS AND METHODS FOR VALIDATING A DEVICE AND AUTHENTICATING A USER

BACKGROUND

A device provides an access point for endpoint devices to access a network, such as the internet and/or a private network. The device may have one or more settings that affect how the device communicates with the endpoint devices and/or how the endpoint devices access the network.

BRIEF DESCRIPTION OF THE DRAWINGS

FIG. 6 is a flow chart of an example process for validating a device and authenticating a user.

DETAILED DESCRIPTION OF PREFERRED EMBODIMENTS

Figure 1A:
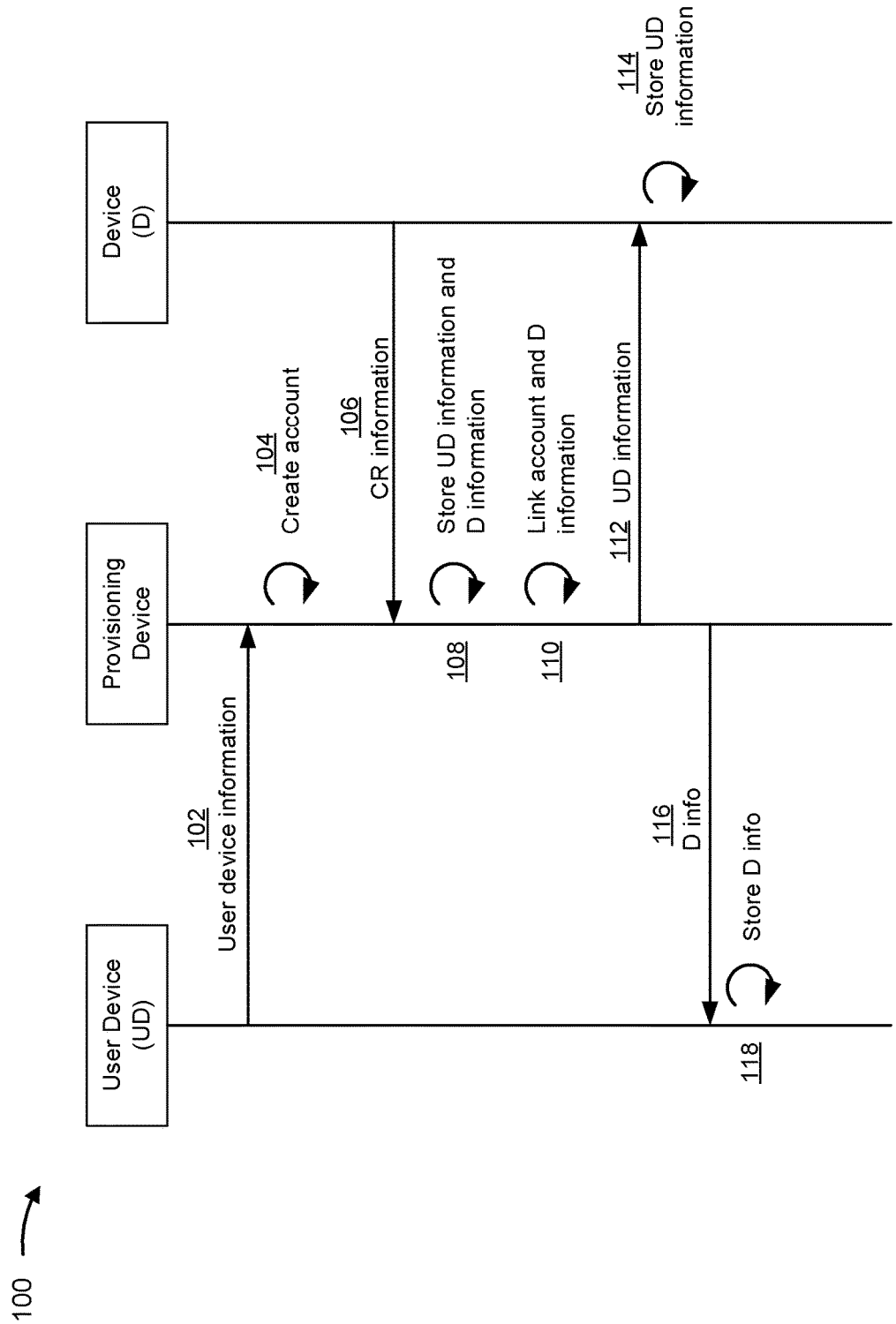
FIGS. 1A-1B are diagrams of one or more example implementations described herein.

The following detailed description of example implementations refers to the accompanying drawings. The same reference numbers in different drawings may identify the same or similar elements.

A user device may establish a connection with a device, such as a router or other customer premises equipment (CPE), to connect to a network, such as the internet and/or a private network. In many cases, a user of the user device accesses the device via the connection provided by the device to change one or more settings of the device to affect how the device communicates with the user device and/or how the user device accesses the network. However, granting access to the device in this manner is inherently dangerous and may compromise the security of the device. For example, any user device connected to the device via the connection provided by the device may be able to access the one or more settings of the device (e.g., using stolen, hacked, and/or the like user identification information), regardless of whether the user device is authorized to access the device.

Some implementations described herein provide a device (e.g., a router, a CPE, and/or the like) that communicates with a provisioning device (e.g., a provisioning server device) and/or a management device (e.g., a management server device) to validate a user device and/or authenticate a user of the user device before permitting the user device to access the device. In some implementations, the device determines information concerning the device and sends the information concerning the device to the provisioning device. In some implementations, the device receives, from the provisioning device, information concerning the user device, and receives, from the management device, a request concerning the user device accessing the device. In some implementations, the request includes information identifying device and information identifying the user device. In some implementations, the device generates a request response by validating the user device for access to the device based on the request and sends, to the management device, the request response to facilitate a communication session to be established between the user device and the device. Additionally, or alternatively, the device receives authorization data, from the management device, that includes identification information concerning the user of the user device. In some implementations, the device generates an authorization data response by authenticating the authorization data (e.g., by determining that the user of the user device is an authorized user of the device) and sends, to the management device, the authorization data response to facilitate the communication session to be established between the user device and the device. In some implementations, the device communicates with the user device via the communication session.

In this way, the device is able to validate the user device and/or authenticate the user of the user device by communicating with the provisioning device and/or the management device, which enhances the security of the validation and authentication process. For example, in some implementations, the authentication process requires separate devices (e.g., at least 4 devices) to communicate with each other and share information concerning the user device and the device to enable the device to validate the user device. Similarly, in some implementations, the authorization process requires separate devices to communicate with each other and share information concerning the user of the user device and an authorized user of the device to enable the device to validate the user device. This increases the complexity, and therefore the security, for the user device to access the device to access the one or more settings of the device. Moreover, after the device validates the user device and authenticates the user of the user device, the user device and the device communicate via a communication session that may be encrypted, which may further prevent information concerning the one or more settings of device from being compromised.

Figure 1B:
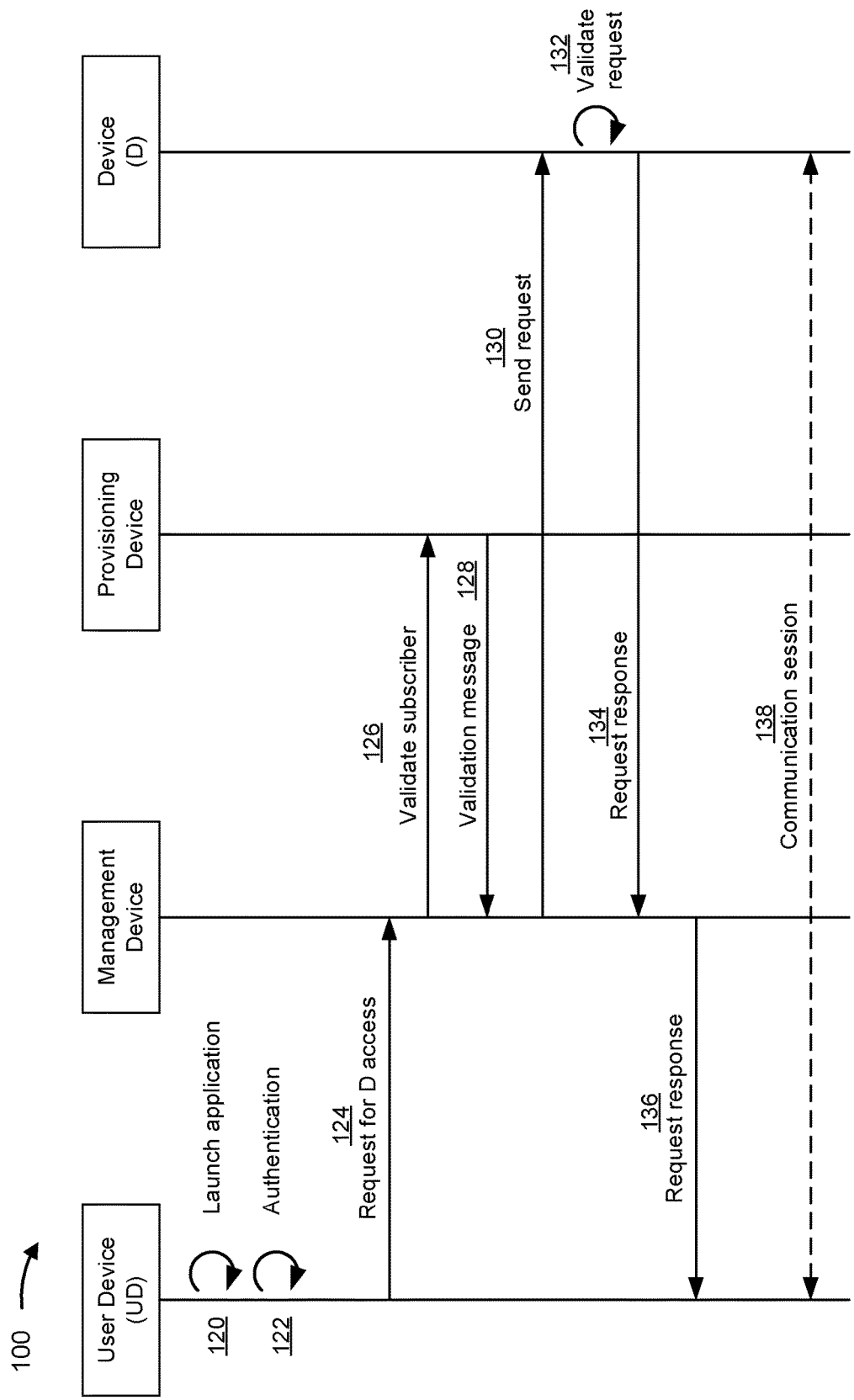

FIGS. 1A-1B are diagrams of one or more example implementations 100 described herein. As shown in FIGS. 1A-1B, example implementation(s) 100 may include a user device, a management device, a provisioning device, and/or a device, such as a router (e.g., a network router), a customer premises equipment (CPE), and/or the like. In some implementations, the user device establishes a connection with the device to connect to a network, such as the internet and/or a private network. In some implementations, the management device, the provisioning device, and/or the device may provide respective application programming interfaces (APIs) for communicating information. For example, the user device and/or device may send information to the management device via a first API provided by the management device. As another example, the user device and/or the device may send information to the provisioning device via a second API provided by the provisioning device.

As shown in FIG. 1A and by reference number 102, the user device may determine and send information concerning the user device to the provisioning device. For example, a user of the user device may direct the user device (e.g., by interacting with a user interface of the user device, such as a keyboard, a touchscreen display, and/or the like) to launch an application to set up the user device and/or the device to allow the user device to connect to the device to access the network. The user device may establish a connection with the provisioning device. Additionally, or alternatively, the provisioning device may initiate the setup process (e.g., upon the device being delivered to the user of the user device) to establish the connection with the user device. The connection may be a secure connection (e.g., an encrypted connection), a cellular connection (e.g., a long-term evolution (LTE) connection, a 5G connection, and/or the like), a connection provided by the device (e.g., a limited connection that allows the user device to communicate with the provisioning device only while attempting to set up the user device and/or device), and/or the like. The user device may send the information concerning the user device to the provisioning device via the connection.

The information concerning the user device may include information that identifies the user device. For example, the information concerning the user device may include: a media access control (MAC) address of the user device; an integrated circuit card identifier (ICCID) of the user device; an international mobile equipment identity (IMEI) of the user device; a mobile device number (MDN) of the user device; a mobile identification number (MIN) of the user device; an identification string associated with the user device; a serial number associated with the user device; a username associated with the user device; a password associated with the user device; and/or the like. In some implementations, the provisioning device may obtain the information concerning the user device from the user device. As shown by reference number 104, the provisioning device may create or update an account for a user of the user device. The account may include the information concerning the user device.

As shown by reference number 106, the device may determine and send information concerning the device to the provisioning device. The device may establish a connection with the provisioning device when a user activates the device (e.g., the user turns the device on, pushes a button on the device to establish a connection with the network, and/or the like). Additionally, or alternatively, the provisioning device may cause the connection to be established. For example, after receiving the information concerning the user device, the provisioning device may establish the connection with the device and/or send a signal to the device to cause the device to establish the connection. The connection may be a secure connection (e.g., an encrypted connection), a cellular connection (e.g., a long-term evolution (LTE) connection, a 5G connection, and/or the like), and/or the like. The device may send the information concerning the device to the provisioning device via the connection.

The information concerning the device may include information that identifies the device. For example, the information concerning the device may include: a MAC address of the device; an ICCID of the device; an IMEI of the device; an identification string associated with the device; a serial number associated with the device; a quick response (QR) code associated with the device; a username associated with the device; a password associated with the device; and/or the like. In some implementations, the provisioning device may obtain the information concerning the device from the device.

As shown by reference number 108, the provisioning device may store the information concerning the user device and/or the information concerning the device. The provisioning device may store the information concerning the user device and/or the information concerning the device in a secured data storage, such as an encrypted data structure, of the provisioning device. This protects the information concerning the user device and/or the information concerning the device from tampering, hacking, and/or the like. As shown by reference number 110, the provisioning device may link the information concerning the device to the account. In some implementations, the provisioning device may send a query to the user device to provide device information (e.g., the identification string associated with the device; the serial number associated with the device, the QR code associated with the device, and/or the like) and the user device may send the device information to the provisioning device in response. For example, the user of the user device may direct the user device to capture an image of the identification string associated with the device, the serial number associated with the device, the QR code associated with the device, and/or the like, and the user device may send the image to the provisioning device. In some implementations, the provisioning device may compare the device information and the information concerning the device stored in the secured data storage of the provisioning device to determine that the user device is correctly attempting to set up access to the device and that the information concerning the device is to be linked to the account. In this way, the provisioning device ensures that the account is associated with the information concerning the user device and the information concerning the device.

As shown by reference number 112, the provisioning device may send the information concerning the user device to the device (e.g., via the secure connection). In some implementations, the device may obtain the information concerning the user device from the provisioning device. As shown by reference number 114, the device may store the information concerning the user device. In some implementations, the device may store the information concerning the user device in a secured data storage, such as an encrypted data structure, of the device. This protects the information concerning the user device from tampering, hacking, and/or the like.

As shown by reference number 116, the provisioning device may send the information concerning the device to the user device (e.g., via the secure connection). In some implementations, the user device may obtain the information concerning the device from the provisioning device. As shown by reference number 118, the user device may store the information concerning the device. In some implementations, the user device may store the information concerning the device in a secured data storage, such as an encrypted data structure, of the device. This protects the information concerning the device from tampering, hacking, and/or the like.

After the user device and/or the device has been setup, the user of the user device may want the user device to access the device to obtain information about one or more settings of the device and/or to change the one or more settings of the device. As shown in FIG. 1B and by reference number 120, the user device may launch an application. In some implementations, the user of the user device may direct the user device (e.g., by interacting with a user interface of the user device, such as a keyboard, a touchscreen display, and/or the like) to launch the application. As shown by reference number by 122, the user may enter information (e.g., a username, a password, and/or the like) into the user device, via the user interface of the user device, to authenticate the user to the user device and/or the application. The user device and/or the application may use an authentication technique, such as a single sign-on technique, a two-step authentication technique, and/or the like, to authenticate the user. The application may facilitate the user device accessing the device to obtain information about the device and/or one or more settings of the device. Additionally, or alternatively, the application may facilitate the user device accessing the device to change the one or more settings of the device. The one or more settings of the device may affect how the device operates, how the device communicates with the user device and/or other devices (e.g., endpoint devices connected to the device), and/or how the user device and/or other devices access the network.

As shown by reference number 124, the user device (e.g., by running the application) may generate and send a request to the management device. The user device and/or the management device may establish a connection (e.g., a secure connection, such as an encrypted connection) between the user device and the management device in a similar manner to establishing a connection between the user device and the provisioning device described in FIG. 1A. The user device may send the request to the management device via the connection. The request may concern the user device accessing the device to obtain information concerning the device, such as the one or more settings of the device. The request may include information identifying the device, such as some of or all of the information concerning the device stored by the user device, and/or information identifying the user device, such as some or all of the information concerning the user device that was determined by the user device. In some implementations, the management device may obtain the request from the user device. In some implementations, the user device and the management device may communicate via the device (as the device may be providing network access to the user device).

As shown by reference number 126, the management device may generate and send a validation subscriber request to the provisioning device. The management device and/or the provisioning device may establish a connection (e.g., a secure connection, such as an encrypted connection) between the management device and the provisioning device in a similar manner to establishing a connection between the user device and the provisioning device described in FIG. 1A. The management device may send the validation subscriber request to the provisioning device via the connection. The validation subscriber request may concern the request and/or may include the information identifying the device and/or the information identifying the user device. In some implementations, the provisioning device may process the validation subscriber request, based on information in the account, to validate the validation subscriber request. For example, the provisioning server may validate the validation subscriber request based on a comparison of the information concerning the user device, that is associated with the account, and the information identifying the user device of the validation subscriber request and/or based on a comparison of the information concerning the device, that is associated with the account, and the information identifying the device of the validation subscriber request. As shown by reference number 128, the provisioning device may generate a validation message based on validating the validation subscriber request, and may send the validation message to the management device (e.g., via the connection). In some implementations, the management device may obtain the validation message from the provisioning device.

As shown by reference number 130, the management device may send the request to the device after obtaining the validation message. The device and/or the management device may establish a connection (e.g., a secure connection, such as an encrypted connection) between the device and the management device in a similar manner to establishing a connection between the device and the provisioning device described in FIG. 1A. The management device may send the request to the device via the connection. In some implementations, the device may obtain the request from the management device via the connection.

As shown by reference number 132, the device may process the request to determine that the request is valid (e.g., the device may validate the user device for access to the device by processing the request). In some implementations, the device may obtain the information concerning the user device from the secured data storage of the device and validate the user device for access to the device based on a comparison of the information identifying the user device from the request and the information concerning the user device obtained from the secured data storage. In some implementations, the device may hash the information concerning the user device for storage in the secured data storage and the device may hash the information identifying the user device from the request to enable the comparison of the information identifying the user device from the request and the information concerning the user device obtained from the secured data storage. In this way, the information concerning the user device and/or the information identifying the user device is protected, even if stolen.

As shown by reference number 134, the device, based on validating the user device for access to the device, may generate and send a request response to the management device (e.g., via the connection). The request response may indicate that the device determined that the request is valid. In some implementations, the management device may obtain the request response from the device. As shown by reference number 136, the management device may send the request response to the user device (e.g., via the connection). In some implementations, the user device may obtain the request response from the management device.

The request response may be used to facilitate a communication session to be established between the user device and the device. For example, the request response may include one or more instructions for the management device to establish the communication session between the user device and the device. As shown by reference number 138, the user device and the device may communicate via the communication session. For example, the user device may send first data to the device via the communication session and the device may send second data to the user device via the communication session. In some implementations, the communication session may be secure (e.g., encrypted). For example, the user device and the device may communicate data that is encrypted using the user device certificate, the device certificate, and/or the like. In some implementations, the first data may include one or more instructions to change one or more settings concerning the device. The device may process the first data to determine the one or more instructions and/or process the one or more instructions to change the one or more settings concerning the device. The one or more settings may be related to how the device operates, how the device accesses a network, how the user device (or another device) accesses a network via the device, and/or the like.

In some implementations, the communication session may be used to route messages between the user device and the device through the management device. For example, the device may generate one or more first messages intended for the user device and send the one or more first messages to the management device via the communication session. The management device may send the one or more first messages to the user device via the communication session. Further, the user device may generate one or more second messages intended for the device and send the one or more second messages to the management device via the communication session and the management device may send the one or more second messages to the device via the communication session.

In some implementations, the communication session may be established directly between the device and the user device (e.g., without going through the management device). For example, the device may generate one or more first messages intended for the user device and send the one or more first messages to the user device via the communication session. Further, the user device may generate one or more second messages intended for the device and send the one or more second messages to the device via the communication session.

As indicated above, FIGS. 1A-1B are provided merely as examples. Other examples can differ from what was described with regard to FIGS. 1A-1B. Further, the number and arrangement of devices and networks shown in FIGS. 1A-1B are provided as an example. In practice, there may be additional devices and/or networks, fewer devices and/or networks, different devices and/or networks, or differently arranged devices and/or networks than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) of example implementation(s) 100 may perform one or more functions described as being performed by another set of devices of example implementation 100.

Figure 2A:
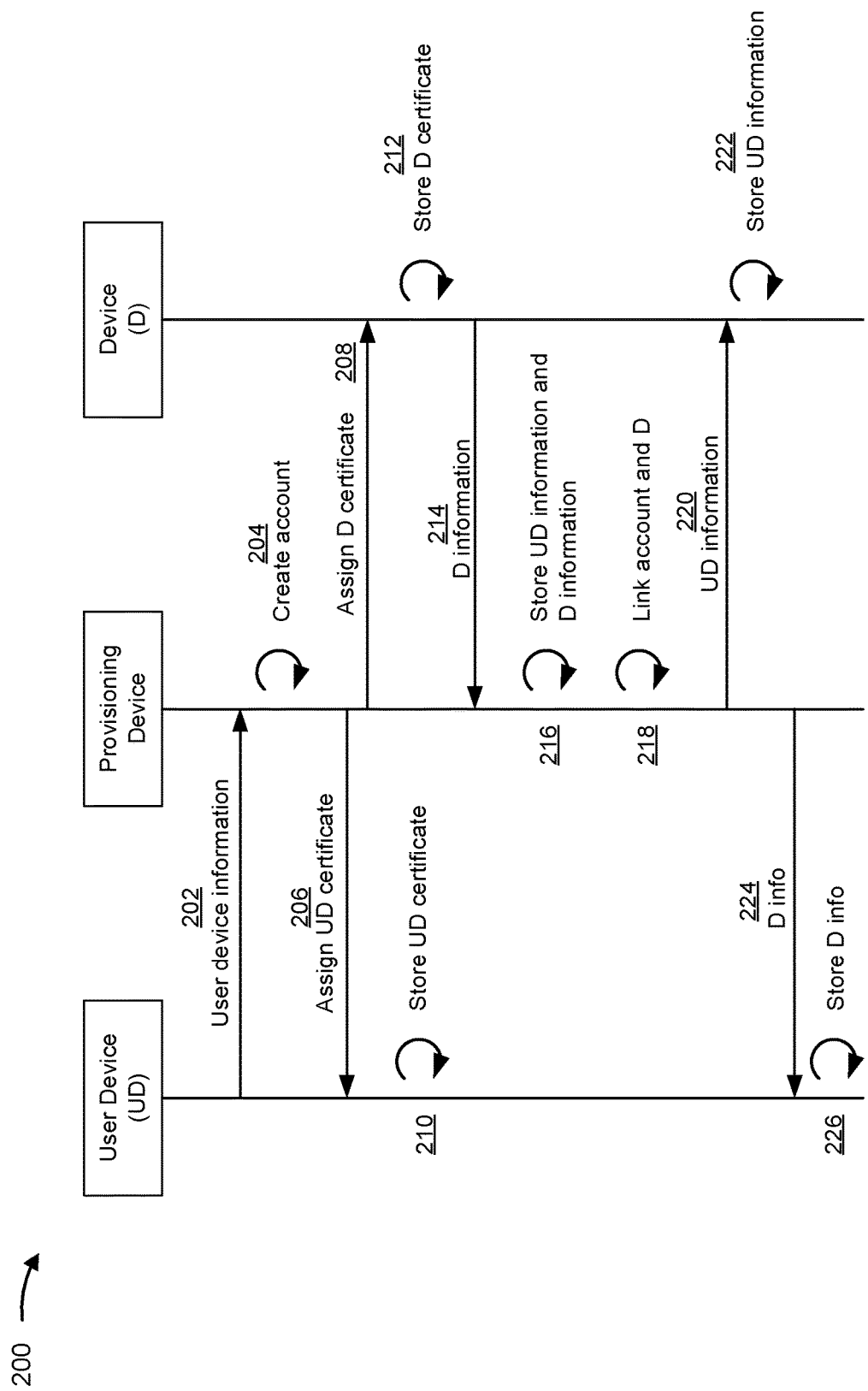
FIGS. 2A-2B are diagrams of one or more example implementations described herein.
Figure 2B:
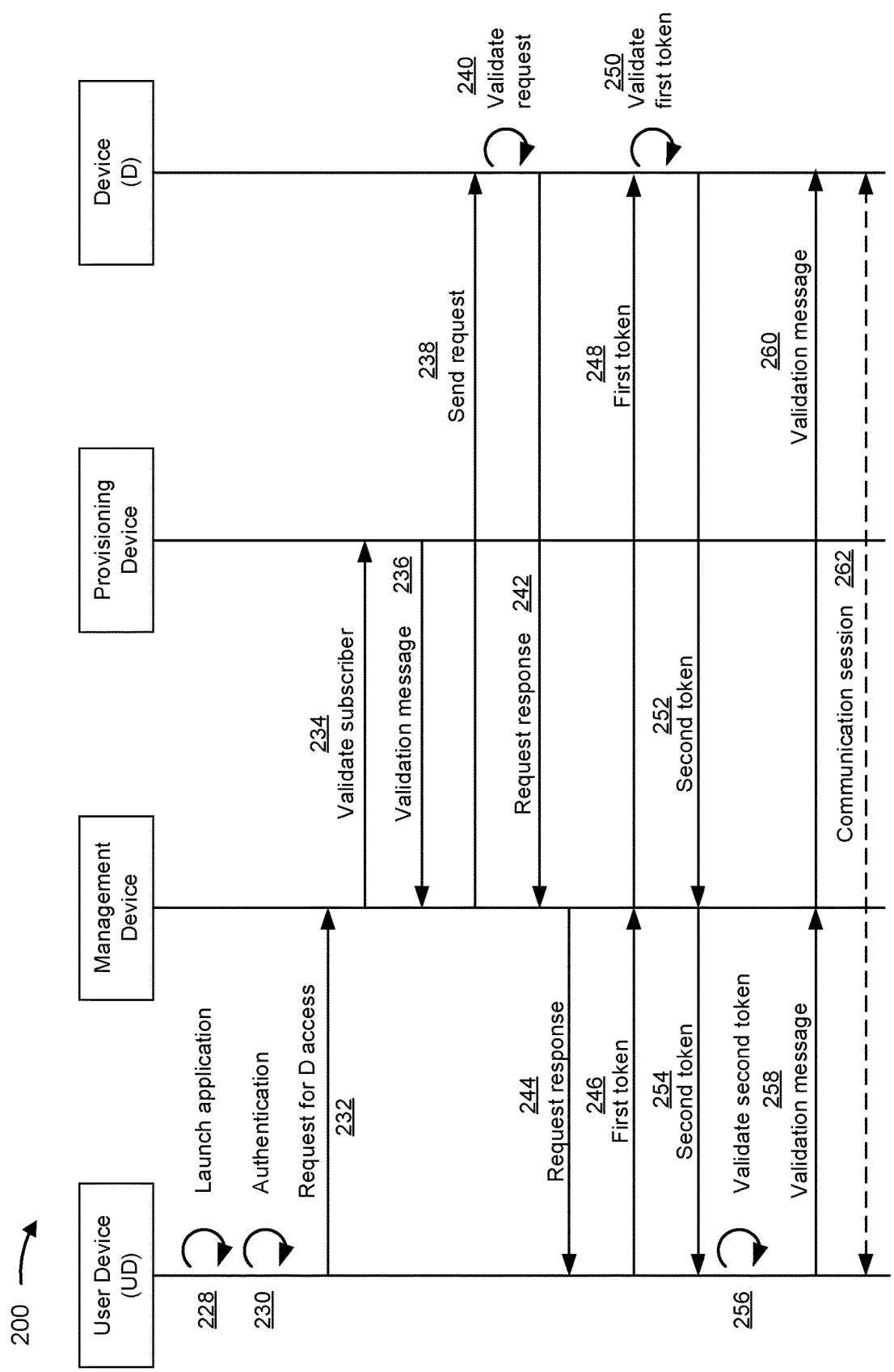

FIGS. 2A-2B are diagrams of one or more example implementations 200 described herein. As shown in FIGS. 2A-2B, example implementation(s) 200 may include a user device, a management device, a provisioning device, and/or a device, such as a router (e.g., a network router), a CPE, and/or the like, as described herein in relation to FIGS. 1A-1B. As shown in FIG. 2A and by reference numbers 202 and 204, the user device may send (e.g., via a secure connection) information concerning the user device to the provisioning device and the provisioning device may create an account for a user of the user device in a similar manner to that described herein in relation to FIG. 1A.

In some implementations, the provisioning device may provide a user device certificate and/or a device certificate, such as a client certificate, a secure sockets layer (SSL) certificate, a transport layer security (TLS) certificate, and/or the like. In some implementations, each certificate may include a respective one or more keys, such as a private key, a public key, and/or the like. As shown by reference number 206, the provisioning device may send (e.g., via a secure connection) the user device certificate to the user device and/or the user device may obtain the user device certificate from the provisioning device. As shown by reference number 208, the provisioning device may send (e.g., via a secure connection) the device certificate to the device and/or the device may obtain the device certificate from the provisioning device. As shown by reference number 210, the user device may store the one or more keys, such as the private key, of the user device certificate and/or the user device certificate. The user device may store the one or more keys of the user device certificate and/or the user device certificate in a secured data storage of the user device. This protects the user device certificate from tampering, hacking, and/or the like. As shown by reference number 212, the device may store the one or more keys, such as the private key, of the device certificate and/or the device certificate. The device may store the one or more keys of the device certificate and/or device certificate in a secured data storage of the device. This protects the device certificate from tampering, hacking, and/or the like.

As shown by reference number 214, the device may determine and send (e.g., via a secure connection) information concerning the device to the provisioning device in a similar manner to that described herein in relation to FIG. 1A. As shown by reference numbers 216 and 218, the provisioning device may store the information concerning the user device and/or the information concerning the device, and may link the account and the information concerning the device in a similar manner to that described herein in relation to FIG. 1A. As shown by reference numbers 220 and 222, the provisioning device may send (e.g., via a secure connection) the information concerning the user device to the device and the device may store the information concerning the user device in a similar manner to that described herein in relation to FIG. 1A. As shown by reference numbers 224 and 226, the provisioning device may send (e.g., via a secure connection) the information concerning the device to the user device and the user device may store the information concerning the device in a similar manner to that described herein in relation to FIG. 1A.

As shown by FIG. 2B and reference numbers 228 and 230, the user device may launch an application and authenticate the user of the user device in a similar manner to that described herein in relation to FIG. 1B. As shown by reference numbers 232, 234, and 236, the user device may generate and send (e.g., via a secure connection) a request to the management device, the management device may send (e.g., via a secure connection) a validation subscriber request to the provisioning device, and the provisioning device may generate and send (e.g., via a secure connection) a validation message to the management device in a similar manner to that described herein in relation to FIG. 1B. As shown by reference numbers 238, 240, 242, and 244, the management device may send (e.g., via a secure connection) the request to the device; the device may validate the request, generate a request response, and send (e.g., via a secure connection) the request response to the management device; and the management device may send (e.g., via a secure connection) the request response to the user device in a similar manner to that described herein in relation to FIG. 1B.

As shown by reference number 246, the user device may generate a first token and send (e.g., via a secure connection) the first token to the management device. The first token may concern the device certificate. For example, the first token may be generated based on a key of the device certificate, such as a public key. In some implementations, the management device may obtain the first token from the user device. As shown by reference number 248, the management device may send (e.g., via a secure connection) the first token to the device. In some implementations, the device may obtain the first token from the management device. As shown by reference number 250, the device may validate the first token. For example, the device may process the first token using a key of the device certificate, such as a private key, to validate the first token. In this way, the device can provide additional security, such that a user device may access the device only if the user device can provide two different types of validating information.

As shown by reference number 252, the device may generate a second token and send (e.g., via a secure connection) the second token to the management device. The second token may concern the user device certificate. For example, the second token may be generated based on a key of the user device certificate, such as a public key. In some implementations, the management device may obtain the second token from the device. As shown by reference number 254, the management device may send (e.g., via a secure connection) the second token to the user device. In some implementations, the user device may obtain the second token from the management device. As shown by reference number 256, the user device may validate the second token. For example, the user device may process the second token using a key of the user device certificate, such as a private key to validate the second token. As shown by reference number 258, the user device may generate a message indicating that the user device validated the second token and send (e.g., via a secure connection) the message to the management device. In some implementations, the management device may obtain the message from the user device. As shown by reference number 260, the management device may send (e.g., via a secure connection) the message to the device and/or the device may obtain the message from the management device.

The second token and/or the message indicating that the user device validated the second token may be used to facilitate a communication session to be established between the user device. For example, the second token and/or the message may include one or more instructions for the management device to establish the communication session between the user device and the device. As shown by reference number 262, the user device and the device may communicate via the communication session in a similar manner to that described herein in relation to FIG. 1B.

As indicated above, FIGS. 2A-2B are provided merely as examples. Other examples can differ from what was described with regard to FIGS. 2A-2B. Further, the number and arrangement of devices and networks shown in FIGS. 2A-2B are provided as an example. In practice, there may be additional devices and/or networks, fewer devices and/or networks, different devices and/or networks, or differently arranged devices and/or networks than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) of example implementation(s) 200 may perform one or more functions described as being performed by another set of devices of example implementation 200.

Figure 3A:
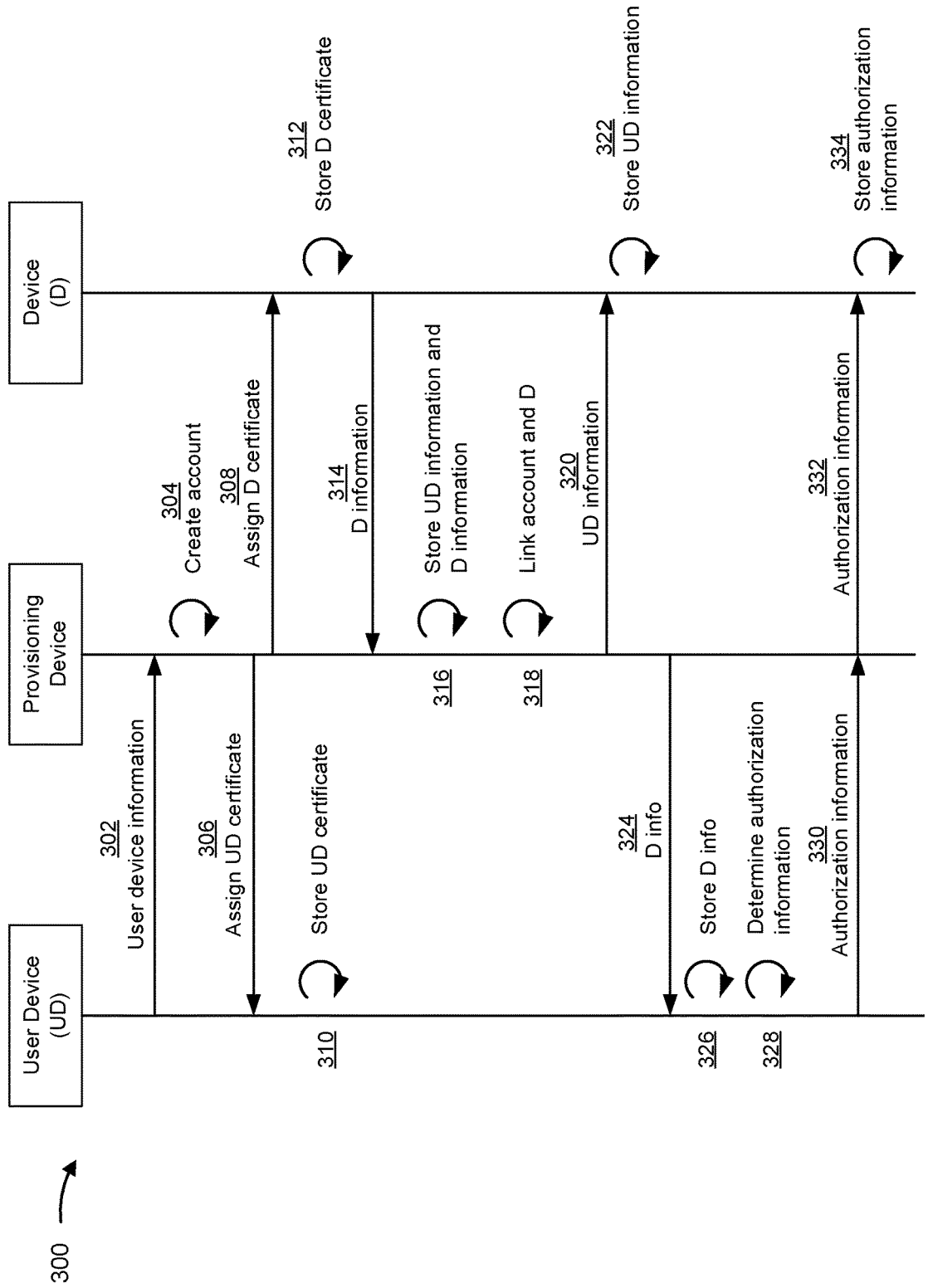
FIGS. 3A-3B are diagrams of one or more example implementations described herein.
Figure 3B:
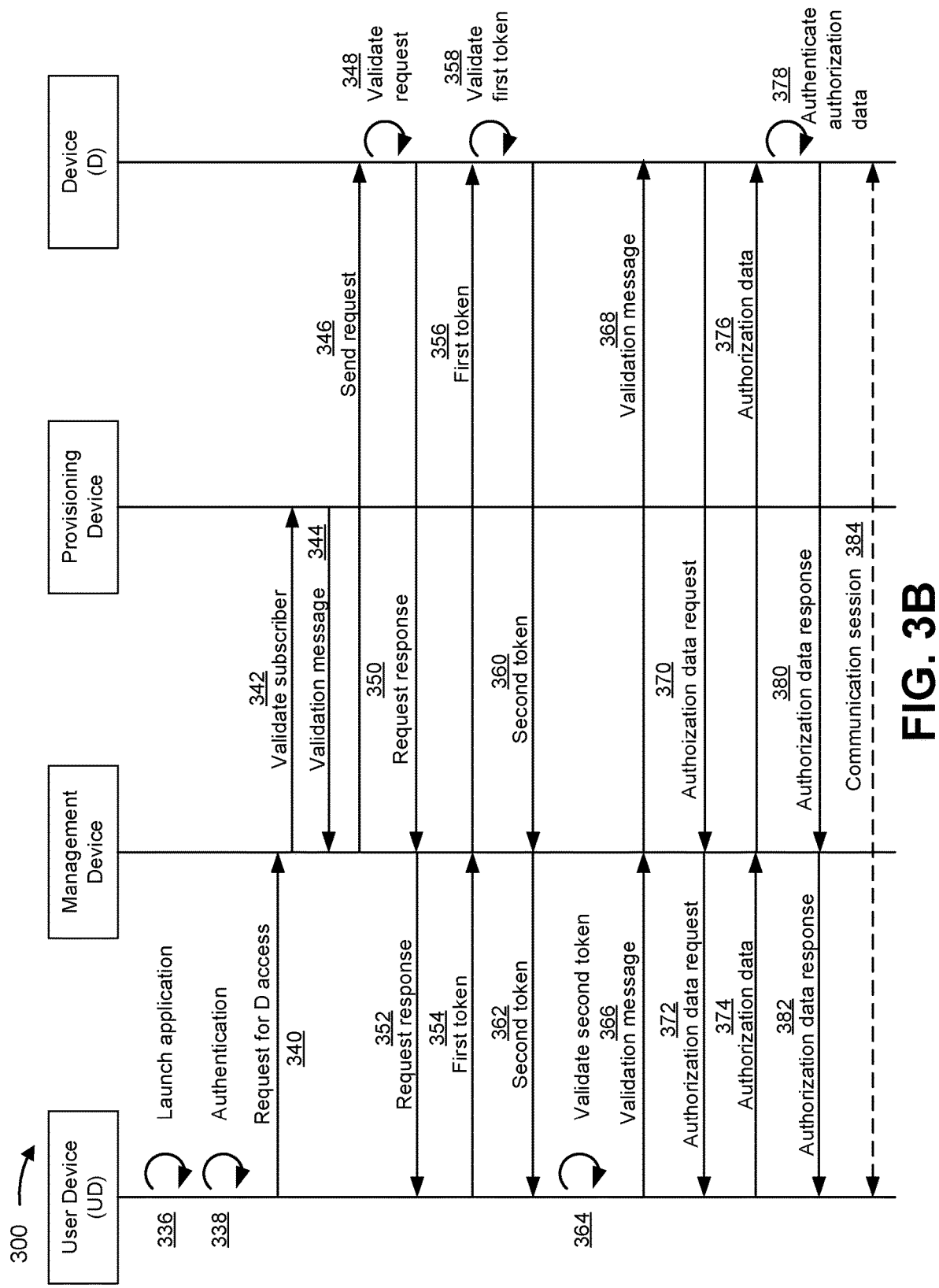

FIGS. 3A-3B are diagrams of one or more example implementations 300 described herein. As shown in FIGS. 3A-3B, example implementation(s) 300 may include a user device, a management device, a provisioning device, and/or a device, such as a router (e.g., a network router), a CPE, and/or the like, as described herein in relation to FIGS. 1A-1B and 2A-2B. As shown in FIG. 3A and by reference numbers 302 and 304, the user device may send (e.g., via a secure connection) information concerning the user device to the provisioning device and the provisioning device may create an account for a user of the user device in a similar manner to that described herein in relation to FIGS. 1A and 2A. As shown by reference numbers 306 and 308, the provisioning device may generate a user device certificate and/or a device certificate, may send (e.g., via a secure connection) the user device certificate to the user device, and may send (e.g., via a secure connection) the device certificate to the device in a similar manner to that described herein in relation to FIG. 2A. As shown by reference numbers 310 and 312, the user device may store the user device certificate and the device may store the device certificate in a similar manner to that described herein in relation to FIG. 2A.

As shown by reference number 314, the device may determine and send (e.g., via a secure connection) information concerning the device to the provisioning device in a similar manner to that described herein in relation to FIGS. 1A and 2A. As shown by reference numbers 316 and 318, the provisioning device may store the information concerning the user device and/or the information concerning the device, and may link the account and the information concerning the device in a similar manner to that described herein in relation to FIGS. 1A and 2A. As shown by reference numbers 320 and 322, the provisioning device may send (e.g., via a secure connection) the information concerning the user device to the device and the device may store the information concerning the user device in a similar manner to that described herein in relation to FIGS. 1A and 2A. As shown by reference numbers 324 and 326, the provisioning device may send (e.g., via a secure connection) the information concerning the device to the user device and the user device may store the information concerning the device in a similar manner to that described herein in relation to FIGS. 1A and 2A.

As shown by reference number 328, the user device may determine authorization information concerning an authorized user of the device (e.g., a user associated with the account created by the provisioning device). The authorization information may include identification information concerning the authorized user, such as biometric information. The biometric information may include a voice profile of the authorized user, a facial profile of the authorized user, a fingerprint profile of the authorized user, a retina profile of the authorized user, and/or the like. In some implementations, the user of user device may enter the authorization information into the user device, via the user interface of the user device. For example, the user may direct the user device to capture audio data (e.g. via a microphone of the user device) of the user uttering words to generate the voice profile, to capture image data (e.g., via a camera of the user device) of the user's face to generate the facial profile, to capture image data of the user's fingerprint(s) to generate the fingerprint profile, to capture image data of the user's retina(s) to generate the retina profile, and/or the like. As shown by reference number 330, the user device may send (e.g., via a secure connection) the authorization information to the provisioning device and/or the provisioning device may obtain the authorization information from the user device. For example, the user device may send the authorization information to the provisioning device via the connection (e.g., a secured connection) established by the user device and/or the provisioning device. As shown by reference number 332, the provisioning device may send (e.g., via a secure connection) the authorization information to the device and/or the device may obtain the authorization information from the provisioning device. As shown by reference number 334, the device may store the authorization information. The device may store the authorization information in a secured data storage of the device. This protects the authorization information from tampering, hacking, and/or the like.

As shown by FIG. 3B and reference numbers 336 and 338, the user device may launch an application and authenticate the user of the user device in a similar manner to that described herein in relation to FIGS. 1B and 2B. As shown by reference numbers 340, 342, and 344, the user device may generate and send (e.g., via a secure connection) a request to the management device, the management device may generate and send (e.g., via a secure connection) a validation subscriber request to the provisioning device, and the provisioning device may generate and send (e.g., via a secure connection) a validation message to the management device in a similar manner to that described herein in relation to FIGS. 1B and 2B. As shown by reference numbers 346, 348, 350, and 352, the management device may send (e.g., via a secure connection) the request to the device; the device may validate the request, generate a request response, and send (e.g., via a secure connection) the request response to the management device; and the management device may send (e.g., via a secure connection) the request response to the user device in a similar manner to that described herein in relation to FIGS. 1B and 2B.

As shown by reference numbers 354, 356, and 358, the user device may generate a first token and send (e.g., via a secure connection) the first token to the management device, the management device may send (e.g., via a secure connection) the first token to the device, and the device may validate the first token in a similar manner to that described herein in relation to FIG. 2B. As shown by reference numbers 360, 362, and 364, the device may generate a second token and send (e.g., via a secure connection) the second token to the management device, the management device may send (e.g., via a secure connection) the second token to the user device, and the user device may validate the second token in a similar manner to that described herein in relation to FIG. 2B. As shown by reference numbers 366 and 368, the user device may generate a message indicating that the user device validated the second token and send (e.g., via a secure connection) the message to the management device and the management device may send (e.g., via a secure connection) the message to the device in a similar manner to that described herein in relation to FIG. 2B.

As shown by reference number 370, the device may generate and send (e.g., via a secure connection) an authorization data request to the management device. The authorization data request may indicate that the user device is to send authorization data to the device so that the device may authenticate the user of the user device as an authorized user of the device. In some implementations, the management device may obtain the authorization data request from the device. As shown by reference number 372, the management device may send (e.g., via a secure connection) the authorization data request to the user device and/or the user device may obtain the authorization data request from the management device.

As shown by reference number 374, the user device may generate authorization data and send (e.g., via a secure connection) the authorization data to the management device. The authorization data may include identification information concerning the user of the user device, such as biometric data. For example, the biometric data may include audio data concerning a voice of the user, image data concerning a face of the user, image data concerning a fingerprint of the user, image data concerning a retina of the user, and/or the like. In some implementations, the user of user device may enter the authorization data into the user device, via the user interface of the user device. For example, the user may direct the user device to capture the audio data concerning the voice of the user (e.g. via the microphone of the user device), to capture image data concerning the face of the user (e.g., via a camera of the user device), to capture image data concerning the fingerprint of the user, to capture image data concerning the retina of the user, and/or the like. In some implementations, the management device may obtain the authorization data from the user device. As shown by reference number 376, the management device may send (e.g., via a secure connection) the authorization data to the device and/or the device may obtain the authorization data from the user device.

As shown by reference number 378, the device may authenticate the authorization data. For example, the device may obtain the authorization information from the secured data storage of the device and may determine that the user of the user device is an authorized user of the device based on a comparison of the authorization data and the authorization information obtained from the secured data storage. As another example, the device may determine that the user of the user device is an authorized user of the device based on a comparison of the biometric data included in the identification information from the authorization data and the biometric information concerning an authorized user of the router included in the authorization information.

In some implementations, the device may process the authorization data to determine the biometric data included in the authorization data. The device may process the biometric data using a biometric identification technique, such as an audio processing technique (e.g., a natural language processing technique), a facial recognition technique, a fingerprint identification technique, a retina scanning technique, and/or the like, to identify the voice, the face, the fingerprint, the retina, and/or the like of the user of the user device. The device may compare the voice, the face, the fingerprint, the retina, and/or the like of the user of the user device included in the biometric data and the voice profile, the facial profile, the fingerprint profile, the retina profile, and/or the like of the authorized user included in the biometric information to determine that biometric data matches the biometric information within a particular threshold (e.g., 100% match, 98% match, 95% match, etc.). In this way the device may authenticate the authorization data and/or determine that user of the user device is an authorized user of the device. In this way, the device can provide additional security, such that a user device may access the device only if the user of the user device is an authorized user of the device.

As shown by reference number 380, the device, based on authenticating the authorization data, may generate and send (e.g., via a secure connection) an authorization data response to the management device. The authorization data response may indicate that the device determined that user of the user device is an authorized user of the device. In some implementations, the management device may obtain the authorization data response from the device. As shown by reference number 382, the management device may send (e.g., via a secure connection) the authorization data response to the user device. In some implementations, the user device may obtain the authorization data response from the management device.

In some implementations, the authorization data response may be used to facilitate a communication session to be established between the user device and the device. For example, the authorization data response may include one or more instructions for the management device to establish the communication session between the user device and the device. As shown by reference number 384, the user device and the device may communicate via the communication session in a similar manner to that described herein in relation to FIGS. 1B and 2B.

As indicated above, FIGS. 3A-3B are provided merely as examples. Other examples can differ from what was described with regard to FIGS. 3A-3B. Further, the number and arrangement of devices and networks shown in FIGS. 3A-3B are provided as an example. In practice, there may be additional devices and/or networks, fewer devices and/or networks, different devices and/or networks, or differently arranged devices and/or networks than those shown in FIGS. 3A-3B. Furthermore, two or more devices shown in FIGS. 3A-3B may be implemented within a single device, or a single device shown in FIGS. 3A-3B may be implemented as multiple, distributed devices. Additionally, or alternatively, a set of devices (e.g., one or more devices) of example implementation(s) 300 may perform one or more functions described as being performed by another set of devices of example implementation 300.

Moreover, while the examples provided in FIGS. 1A-1B, 2A-2B, and 3A have been separately described, any of the examples can be used alone or in combination with any other one or more of the examples. Further, the examples describe implementations concerning successful validations and/or successful authentications, but implementation include unsuccessful validations and/or unsuccessful authentications. In such implementations, the validating and/or authenticating device (e.g., the user device, the provisioning device, and/or the device) may determine that particular information is not valid and/or authentic and may send an error signal to the device that sent the particular information. In such cases the validating and/or authenticating device may discard the particular information and may prevent a communication session from being established between the user device and device. In some implementations, the validating and/or authenticating device may lock out (e.g., stop accepting information for validation and/or authentication) if a particular amount of unsuccessful attempts to validate and/or authenticate information have been attempted during a particular time period. In this way, some implementations prevent brute force attacks, buffer overflow attacks, and/or the like.

Figure 4:
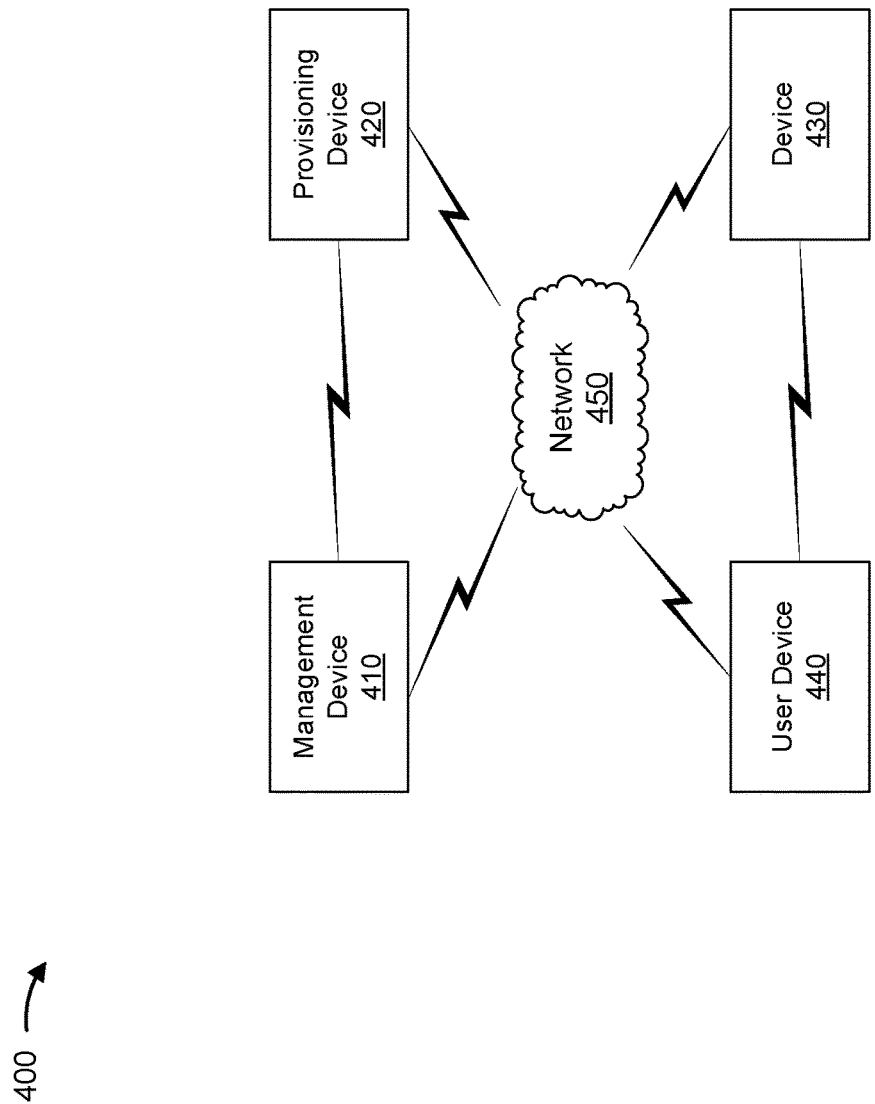
FIG. 4 is a diagram of an example environment in which systems and/or methods described herein may be implemented.

FIG. 4 is a diagram of an example environment 400 in which systems and/or methods, described herein, may be implemented. As shown in FIG. 4, environment 400 may include a management device 410, a provisioning device 420, a device 430, a user device 440, and a network 450. Devices of environment 400 may interconnect via wired connections, wireless connections, or a combination of wired and wireless connections.

Management device 410 includes one or more devices capable of receiving, generating, storing, processing, and/or providing information, such as information described herein. For example, management device 410 may include a server device (e.g., a host server, a web server, an application server, etc.), a data center device, or a similar device. In some implementations, management device 410 may facilitate transmitting information, such as a request, a validation subscriber request, a request response, a first token, a second token, a message, an authorization data request, authorization data, an authorization data response, and/or the like to and/or from provisioning device 420, device 430, and/or user device 440. In some implementations, management device 410 may establish a communication session between device 430 and user device 440. In some implementations, the communication session may route messages between device 430 and user device 440 through management device 410.

Provisioning device 420 includes one or more devices capable of receiving, generating, storing, processing, and/or providing information, such as information described herein. For example, provisioning device 420 may include a server device (e.g., a host server, a web server, an application server, etc.), a data center device, or a similar device. In some implementations, provisioning device 420 may obtain and store information concerning user device 440 and/or information concerning device 430, may create an account associated with the information concerning user device 440 and/or the information concerning device 430, may send the information concerning user device 440 to device 430, and/or may send the information concerning device 430 to user device 440. In some implementations, provisioning device 420 may generate and send a user device certificate to user device 440 and/or a device certificate to device 430. In some implementations, provisioning device 420 may receive authorization information from user device 440 and send the authorization information to device 430. In some implementations, provisioning device 420 may receive a validation subscriber request from management device 410, validate the validation subscriber request, and/or generate and send a validation message to management device 410.

Device 430 includes one or more devices capable of receiving, generating, storing, processing, and/or providing information, such as information described herein. For example, device 430 may include a multi-function networking device that may combine the functions of a Digital Subscriber Line (DSL) or cable modem, a cellular modem (e.g., a long term evolution (LTE) modem, a 5G modem, and/or the like), a firewall, a router, a network switch, and/or a wireless access point into a single device. Device 430 may provide a connection for user device 440 to connect to network 450. Device 430 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used by device 430. Device 430 may also include one or more wired (e.g., Ethernet) connections.

In some implementations, device 430 may receive information, such as information concerning user device 440, a device certificate, and/or authorization information, from provisioning device 420 and store the information in a secured data storage of device 430. In some implementations, device 430 may receive a request from management device 410, validate the request, generate and send a request response to management device 410, receive a first token from management device 410, validate the first token, generate and send a second token to management device 410, receive a message from management device 410, generate and send an authorization data request to management device 410, receive authorization data from management device 410, authenticate the authorization data, generate and send an authorization data response to management device 410, and/or the like. In some implementations, device 430 may communicate with user device 440 via a communication session.

User device 440 includes one or more devices capable of receiving, generating, storing, processing, and/or providing information, such as information described herein. For example, user device 440 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 440 may use a connection provided by device 430 to connect to network 450. In some implementations, user device 440 may receive information, such as information concerning device 430 and/or a user device certificate, from provisioning device 420 and store the information in a secured data storage of device 430. In some implementations, user device 440 may send information, such as information concerning user device 440 and/or authorization information, to provisioning device 420. In some implementations, user device 440 may launch an application, authenticate a user of user device 440, send a request to management device 410, receive a request response from management device 410, generate and send a first token to management device 410, receive a second token from management device 410, validate the second token, generate and send a message to management device 410, receive an authorization data request from management device 410, send authorization data to management device 410, receive an authorization data response from management device 410, and/or the like. In some implementations, user device 440 may communicate with device 430 via a communication session.

Network 450 includes one or more wired and/or wireless networks. For example, network 450 may include a cellular network (e.g., a fifth generation (5G) network, a long-term evolution (LTE) network, a third generation (3G) network, a code division multiple access (CDMA) network, etc.), a public land mobile network (PLMN), a wide area network (WAN), a metropolitan area network (MAN), a telephone network (e.g., the Public Switched Telephone Network (PSTN)), a private network, an ad hoc network, an intranet, the internet, a fiber optic-based network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
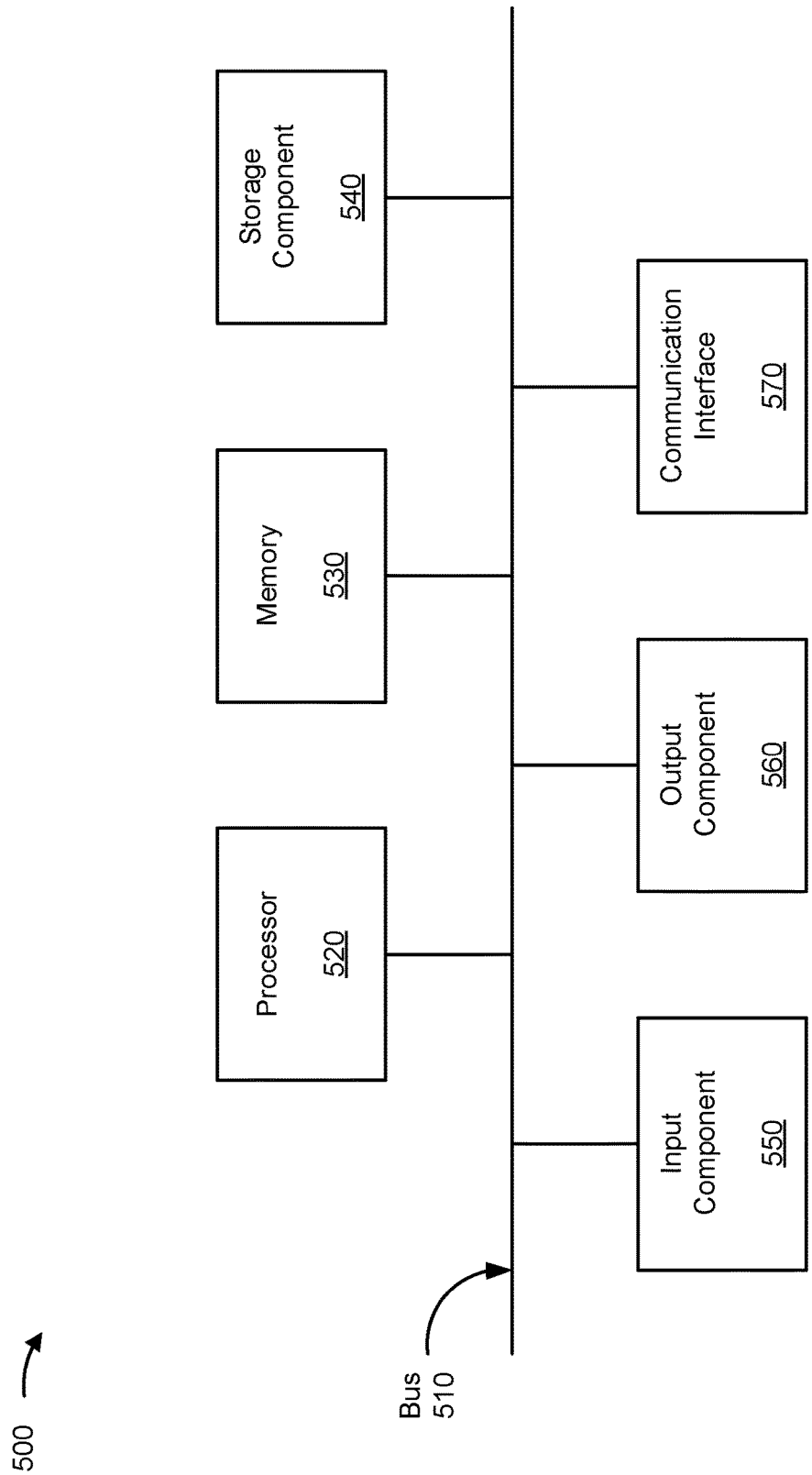
FIG. 5 is a diagram of example components of one or more devices of FIG. 4.

FIG. 5 is a diagram of example components of a device 500. Device 500 may correspond to management device 410, provisioning device 420, device 430, and/or user device 440. In some implementations management device 410, provisioning device 420, device 430, and/or user device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flow chart of an example process 600 for systems and methods for validating a device and authenticating a user. In some implementations, one or more process blocks of FIG. 6 may be performed by a device (e.g., device 430). In some implementations, one or more process blocks of FIG. 6 may be performed by another device or a group of devices separate from or including the device, such as a management device (e.g., management device 410), a provisioning device (e.g., provisioning device 420), a user device (e.g., user device 440), and/or the like.

As shown in FIG. 6, process 600 may include determining information concerning the device, wherein the information concerning the device includes information that identifies the device (block 605). For example, the device (e.g., using processor 520, memory 530, storage component 540, communication interface 570, and/or the like) may determine information concerning the device, as described above. In some implementations, the information concerning the device includes information that identifies the device. For example, the information concerning the device may include a media access control (MAC) address of the device, an integrated circuit card identifier (ICCID) of the device, an international mobile equipment identity (IMEI) of the device, an identification string associated with the device, a serial number associated with the device, a username associated with the device, and/or a password associated with the device.

As further shown in FIG. 6, process 600 may include sending, to a first device, the information concerning the device (block 610). For example, the device (e.g., using processor 520, memory 530, storage component 540, output component 560, communication interface 570, and/or the like) may send, to a first device (e.g., provisioning device 420), the information concerning the device, as described above. In some implementations, the device may send the information concerning the device via a first application programming interface (API).

As further shown in FIG. 6, process 600 may include receiving, from the first device, information concerning a user device, wherein the information concerning the user device includes information that identifies the user device (block 615). For example, the device (e.g., using processor 520, memory 530, storage component 540, input component 550, communication interface 570, and/or the like) may receive, from the first device, information concerning a user device, as described above. In some implementations, the information concerning the user device includes information that identifies the user device. For example, the information concerning the user device may include a media access control (MAC) address of the user device, an integrated circuit card identifier (ICCID) of the user device, an international mobile equipment identity (IMEI) of the user device, a mobile device number (MDN) of the user device, a mobile identification number (MIN) of the user device, an identification string associated with the user device, a serial number associated with the user device, a username associated with the user device; or a password associated with the user device.

As further shown in FIG. 6, process 600 may include receiving, from a second device, a request concerning the user device accessing the device, wherein the request includes information identifying the device and information identifying the user device (block 620). For example, the device (e.g., using processor 520, memory 530, storage component 540, input component 550, communication interface 570, and/or the like) may receive, from a second device (e.g., management device 410), a request concerning the user device accessing the device, as described above. In some implementations, the request includes information identifying the device and information identifying the user device. Additionally, or alternatively, the request may concern the user device accessing the device to obtain information concerning at least one setting of the device.

As further shown in FIG. 6, process 600 may include generating a request response by validating the user device for access to the device based on the request (block 625). For example, the device (e.g., using processor 520, memory 530, storage component 540, output component 560, communication interface 570, and/or the like) may generate a request response by validating the user device for access to the device based on the request, as described above. The device may validate the request by processing, based on the information concerning the device and the information concerning the user device, the request. In some implementations, the request response may indicate that the device determined that the request is valid. Additionally, or alternatively, the request response may include one or more instructions for the second device to establish the communication session between the user device and the device.

As further shown in FIG. 6, process 600 may include sending, to the second device, the request response to facilitate a communication session to be established between the user device and the device (block 630). For example, the device (e.g., using processor 520, memory 530, storage component 540, output component 560, communication interface 570, and/or the like) may send, to the second device, the request response to facilitate a communication session to be established between the user device and the device, as described above. In some implementations, the device may send the request response via a second API.

As further shown in FIG. 6, process 600 may include communicating with the user device via the communication session (block 635). For example, the device (e.g., using processor 520, memory 530, storage component 540, input component 550, communication interface 570, and/or the like) may communicate with the user device via the communication session, as described above. The device may receive data from the user device via the communication session and/or may send data to the user device via the communication session. For example, the device may generate one or more first messages intended for the user device, may send the one or more first messages to the second device via the communication session, and may receive one or more second messages that were generated by the user device from the second device via the communication session. As another example, when the communication session uses a connection provided by the device for the user device to connect to a network, the device may generate one or more first messages intended for the user device, may send the one or more first messages to the user device via the communication session, and may receive one or more second messages that were generated by the user device from the user device via the communication session.

Process 600 may include additional implementations, such as any single implementation or any combination of implementations described below and/or in connection with one or more other processes described elsewhere herein.

In some implementations, the device may receive, from the first device, a certificate, associated with the device, that includes at least one key, may receive, from the second device and after sending the request response, a first token, may validate the first token based on the certificate associated with the device (e.g. by using the at least one key of the certificate associated with the device), and may generate and send, to the second device and based on validating the first token, a second token concerning a certificate associated with the user device to facilitate the communication session to be established between the user device and device.

In some implementations, the device may receive, from the first device and before receiving the request, biometric information concerning an authorized user of the device; may receive, from the second device and after sending the request response, biometric data concerning a user of the user device; may authenticate the user based on the biometric data and the biometric information; may determine and/or generate, based on the biometric information and the biometric data, a biometric data response that indicates that the user of the user device is the authorized user of the device; and may send, to the second device, the biometric data response to facilitate the communication session to be established between the user device and device. The biometric information may include a voice profile of an authorized user, a facial profile of the authorized user, a fingerprint profile of the authorized user, and/or a retina profile of the authorized user. The biometric data concerning the user of the user device may include audio data concerning a voice of the user, image data concerning a face of the user, image data concerning a fingerprint of the user, or image data concerning a retina of the user.

In some implementations, the device may store, after receiving the information concerning the user device, the information concerning the user device in a secured data storage, and, when generating the request response by validating the user device for access to the device based on the request, the device may obtain the information concerning the user device from the secured data storage and may validate the user device for access to the device based on a comparison of the information identifying the user device from the request and the information concerning the user device obtained from the secured data storage.

In some implementations, the device may process the data to determine one or more instructions and may process the one or more instructions to change at least one setting concerning the device.

In some implementations, the device may receive, from the second device and after sending the request response, authorization data concerning a user of the user device, and may generate an authorization data response by authenticating the authorization data, and may send, to the second device, the authorization data response to facilitate the communication session to be established between the user device and the router. The authorization data may include identification information concerning the user of the user device, such as biometric data. In some implementations, when generating the authorization data response by authenticating the authorization data, the device may determine that the user of the user device is an authorized user of the router based on a comparison of the biometric data included in the identification information from the authorization data and biometric information concerning an authorized user of the router.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine information concerning the device,
wherein the information concerning the device includes information that identifies the device;
send, to a second device, the information concerning the device;
receive, from the second device, information concerning a user device,
wherein the information concerning the user device includes information that identifies the user device;
receive, from a third device, a request concerning the user device accessing the device,
wherein the request includes information identifying the device and information identifying the user device;
generate a request response by validating the user device for access to the device based on the request;
send, to the third device, the request response to facilitate a communication session to be established between the user device and the device;
receive, from the third device and after sending the request response, a first token;
validate the first token based on a certificate associated with the device;
send, to the third device and based on validating the first token, a second token to facilitate the communication session to be established between the user device and the device; and
receive, from the user device, data via the communication session.

2. The device of claim 1, wherein the information concerning the device includes at least one of:
a media access control (MAC) address of the device;
an integrated circuit card identifier (ICCID) of the device;
an international mobile equipment identity (IMEI) of the device;
an identification string associated with the device;
a serial number associated with the device;
a username associated with the device; or
a password associated with the device.

3. The device of claim 1, wherein the information concerning the user device includes at least one of:
a media access control (MAC) address of the user device;
an integrated circuit card identifier (ICCID) of the user device;
an international mobile equipment identity (IMEI) of the user device;
a mobile device number (MDN) of the user device;
a mobile identification number (MIN) of the user device;
an identification string associated with the user device;
a serial number associated with the user device;
a username associated with the user device; or
a password associated with the user device.

4. The device of claim 1, wherein the one or more processors are further to:
receive, from the second device and before receiving the request, biometric information concerning an authorized user of the device;
receive, from the third device and after sending the request response, biometric data concerning a user of the user device;
determine, based on the biometric information and the biometric data, a biometric data response that indicates that the user of the user device is the authorized user of the device; and
send, to the third device, the biometric data response to facilitate the communication session to be established between the user device and device.

5. The device of claim 1, wherein the one or more processors are further to:
store, after receiving the information concerning the user device, the information concerning the user device in a secured data storage,
wherein the one or more processors, when generating the request response by validating the user device for access to the device based on the request, are to:
obtain the information concerning the user device from the secured data storage; and
validate the user device for access to the device based on a comparison of the information identifying the user device from the request and the information concerning the user device obtained from the secured data storage.

6. The device of claim 1, wherein the one or more processors are further to:
process the data to determine one or more instructions; and
process the one or more instructions to change at least one setting concerning the device.

7. The device of claim 1, wherein the request is validated by the second device.

8. A non-transitory computer-readable medium storing instructions, the instructions comprising:
one or more instructions that, when executed by one or more processors of a router, cause the one or more processors to:
determine information concerning the router;
send, to a first device, the information concerning the router;
receive, from the first device, information concerning a user device;
receive, from a second device and after receiving the information concerning the user device, a request concerning the user device accessing the router;
process, based on the information concerning the router and the information concerning the user device, the request to determine that the request is valid;
generate a request response that indicates that the router determined that the request is valid;
send, to the second device, the request response to facilitate a communication session to be established between the user device and the router;
receive, from the first device, a certificate, associated with the router, that includes at least one key;
receive, from the second device and after sending the request response, a first token concerning the certificate associated with the router;
validate the first token based on the at least one key;
send, to the second device and based on validating the first token, a second token concerning a certificate associated with the user device to facilitate the communication session to be established between the user device and the router; and
send, to the user device, data via the communication session.

9. The non-transitory computer-readable medium of claim 8, wherein the one or more instructions, that cause the one or more processors to send the information concerning the router, cause the one or more processors to:
   send the information concerning the router via a first application programming interface (API),
      wherein the one or more instructions, that cause the one or more processors to send the request response, cause the one or more processors to:
         send the request response via a second API.

10. The non-transitory computer-readable medium of claim 8, wherein the one or more instructions, when executed by the one or more processors, further cause the one or more processors to:
   receive biometric information from the first device;
   receive, from the second device and after sending the request response, biometric data concerning a user of the user device;
   generate a biometric data response by authenticating the user based on the biometric data and the biometric information; and
   send, to the second device, the biometric data response to facilitate the communication session to be established between the user device and the router.

11. The non-transitory computer-readable medium of claim 10, wherein the biometric information includes at least one:
   a voice profile of an authorized user;
   a facial profile of the authorized user;
   a fingerprint profile of the authorized user; or
   a retina profile of the authorized user.

12. The non-transitory computer-readable medium of claim 10, wherein the biometric data concerning the user of the user device includes at least one of:
   audio data concerning a voice of the user;
   image data concerning a face of the user;
   image data concerning a fingerprint of the user; or
   image data concerning a retina of the user.

13. The non-transitory computer-readable medium of claim 8, wherein the request is validated by the first device.

14. A method, comprising:
   determining, by a router, information concerning the router;
   receiving, by the router and from a first device, information concerning a user device,
      wherein the router is to provide a connection for the user device to connect to a network;
   receiving, by the router and from a second device, a request concerning the user device accessing the router to obtain information concerning at least one setting of the router;
   validating, by the router and based on the information concerning the router and the information concerning the user device, the request to generate a request response;
   sending, by the router and to the second device, the request response to facilitate a communication session to be established between the user device and the router;
   receiving, from the second device and after sending the request response, authorization data concerning a user of the user device,
      wherein the authorization data includes identification information concerning the user of the user device;
   generating an authorization data response by authenticating the authorization data;
   sending, to the second device, the authorization data response to facilitate the communication session to be established between the user device and the router; and
   communicating, by the router, with the user device via the communication session.

15. The method of claim 14, wherein communicating with the user device via the communication session comprises:
   generating one or more first messages intended for the user device;
   sending the one or more first messages to the second device via the communication session; and
   receiving one or more second messages that were generated by the user device from the second device via the communication session.

16. The method of claim 14, wherein the communication session uses the connection provided by the router for the user device to connect to the network,
   wherein communicating with the user device via the communication session comprises:
      generating one or more first messages intended for the user device;
      sending the one or more first messages to the user device via the communication session; and
      receiving one or more second messages that were generated by the user device from the user device via the communication session.

17. The method of claim 14, wherein the request response includes one or more instructions for the second device to establish the communication session between the user device and the router.

18. The method of claim 14, further comprising:
   receiving, from the second device and after sending the request response, a first token;
   generating a second token by validating the first token; and
   sending, to the second device, the second token to facilitate the communication session to be established between the user device and the router.

19. The method of claim 14, wherein the identification information includes biometric data,
   wherein generating the authorization data response by authenticating the authorization data comprises:
      determining that the user of the user device is an authorized user of the router based on a comparison of the biometric data included in the identification information from the authorization data and biometric information concerning an authorized user of the router.

20. The method of claim 14, wherein the request is validated by the first device.

* * * * *